US012485316B2

(12) United States Patent
Yoo et al.

(10) Patent No.: US 12,485,316 B2
(45) Date of Patent: Dec. 2, 2025

(54) EXERCISE EQUIPMENT MANAGEMENT METHOD AND DEVICE THEREOF

(71) Applicant: DRAX INC., Anyang-si (KR)

(72) Inventors: Seon Kyung Yoo, Seoul (KR); Jae Sang Park, Seongnam-si (KR)

(73) Assignee: DRAX INC., Anyang-si (KR)

( * ) Notice: Subject to any disclaimer, the term of this patent is extended or adjusted under 35 U.S.C. 154(b) by 246 days.

(21) Appl. No.: 18/019,361

(22) PCT Filed: Aug. 2, 2021

(86) PCT No.: PCT/KR2021/010065
§ 371 (c)(1),
(2) Date: Feb. 2, 2023

(87) PCT Pub. No.: WO2022/030914
PCT Pub. Date: Feb. 10, 2022

(65) Prior Publication Data

US 2023/0264075 A1 Aug. 24, 2023

(30) Foreign Application Priority Data

Aug. 5, 2020 (KR) ........................ 10-2020-0098134
Sep. 9, 2020 (KR) ........................ 10-2020-0115655
Nov. 24, 2020 (KR) ........................ 10-2020-0159094

(51) Int. Cl.
*A63B 71/06* (2006.01)
*A63B 24/00* (2006.01)
(Continued)

(52) U.S. Cl.
CPC ...... *A63B 24/0087* (2013.01); *A63B 71/0619* (2013.01); *A63B 71/0697* (2013.01);
(Continued)

(58) Field of Classification Search
CPC ............ A63B 24/0087; A63B 71/0619; A63B 71/0697; A63B 21/063; A63B 2225/20;
(Continued)

(56) References Cited

U.S. PATENT DOCUMENTS 7,056,265 B1 6/2006 Shea
10,915,231 B1 * 2/2021 Bacon ................ G06F 3/04847
(Continued)

FOREIGN PATENT DOCUMENTS

JP 2004-65382 A 3/2004
JP 2013-103020 A 5/2013
(Continued)

OTHER PUBLICATIONS

Extended European Search Report issued Aug. 8, 2024 in Application No. 21853630.8.
(Continued)

*Primary Examiner* — Sundhara M Ganesan
(74) *Attorney, Agent, or Firm* — Sughrue Mion, PLLC

(57) ABSTRACT

Provided are an exercise management method and server thereof. The exercise management method includes providing a notification that an exercise mode is set with respect to a first exercise machine from among a plurality of exercise machines and setting a second exercise machine arranged within a predetermined distance from the first exercise machine from among the plurality of exercise machines in a lock mode.

12 Claims, 12 Drawing Sheets

(51) Int. Cl.
*G07C 9/00* (2020.01)
*A63B 21/062* (2006.01)

(52) U.S. Cl.
CPC ........ *G07C 9/00896* (2013.01); *A63B 21/063* (2015.10); *A63B 2225/20* (2013.01)

(58) Field of Classification Search
CPC ............ A63B 21/0628; A63B 71/0622; A63B 2071/0081; A63B 2220/20; A63B 2225/10; A63B 2225/72; G07C 9/00896; G16H 40/67; G16H 20/30
See application file for complete search history.

(56) References Cited

U.S. PATENT DOCUMENTS

| | | | |
|---|---|---|---|
| 10,926,128 B2 | 2/2021 | Yoo et al. | |
| 2004/0229730 A1 | 11/2004 | Ainsworth et al. | |
| 2005/0010426 A1* | 1/2005 | Chen | G06Q 10/02 482/8 |
| 2010/0222178 A1* | 9/2010 | Shea | A63B 24/0062 482/4 |
| 2011/0065549 A1 | 3/2011 | Jung et al. | |
| 2012/0220429 A1 | 8/2012 | Yoshida et al. | |
| 2015/0302331 A1* | 10/2015 | Randall | G06Q 10/06311 705/7.13 |
| 2016/0193499 A1 | 7/2016 | Kim et al. | |
| 2021/0016150 A1 | 1/2021 | Jeong et al. | |
| 2021/0357820 A1* | 11/2021 | Weir | G08B 5/221 |

FOREIGN PATENT DOCUMENTS

| | | |
|---|---|---|
| JP | 2020-48827 A | 4/2020 |
| KR | 20-0353290 Y1 | 6/2004 |
| KR | 10-2011-0029799 A | 3/2011 |
| KR | 10-2012-0012754 A | 2/2012 |
| KR | 10-2012-0014471 A | 2/2012 |
| KR | 10-1432129 B1 | 8/2014 |
| KR | 10-1571362 B1 | 11/2015 |
| KR | 10-1616545 B1 | 4/2016 |
| KR | 10-2016-0077862 A | 7/2016 |
| KR | 10-2016-0084703 A | 7/2016 |
| KR | 10-2017-0135591 A | 12/2017 |
| KR | 10-1871388 B1 | 6/2018 |
| KR | 10-2018-0100753 A | 9/2018 |
| KR | 10-1982168 B1 | 5/2019 |
| KR | 10-2019-0099555 A | 8/2019 |
| KR | 10-2019724 B1 | 9/2019 |
| KR | 10-2031243 B1 | 10/2019 |
| KR | 10-2020-0005780 A | 1/2020 |
| KR | 10-2020-0022776 A | 3/2020 |
| KR | 10-2088673 B1 | 3/2020 |
| KR | 10-2020-0064558 A | 6/2020 |
| WO | 2009/034309 A1 | 3/2009 |

OTHER PUBLICATIONS

Office Action dated Jan. 2, 2023 issued by the Korean Patent Office in Korean Application No. 10-2020-0159094.
Office Action dated Sep. 29, 2022 issued by the Korean Patent Office in Korean Application No. 10-2020-0159084.
Office Action dated Sep. 29, 2022 issued by the Korean Patent Office in Korean Application No. 10-2020-0159086.
Office Action dated Sep. 29, 2022 issued by the Korean Patent Office in Korean Application No. 10-2020-0159087.
Office Action dated Sep. 8, 2022 issued by the Korean Patent Office in Korean Application No. 10-2020-0159094.
"Frequently Asked Questions for Social Distancing Configuration", BITLA Solutions Simplified, Jun. 24, 2020, Bitla Software Pvt. Ltd., Retrieved from: https:www.bitlasoft.com/blog/frequently-asked-questions-for-social-distancing-configuration/ , pp. 1-8 (8 pages total).
International Search Report dated Nov. 17, 2021 in International Application No. PCT/KR2021/010065.
Written Opinion of the International Searching Authority dated Nov. 17, 2021 in International Application No. PCT/KR2021/010065.
Office Action issued Jul. 27, 2023 in Korean Application No. 10-2023-0082133.
Chinese Office Action dated May 21, 2025 in Application No. 202180056799.4.

* cited by examiner

EXERCISE EQUIPMENT MANAGEMENT METHOD AND DEVICE THEREOF

TECHNICAL FIELD

The disclosure relates to a method and an apparatus for managing exercise equipment.

BACKGROUND ART

Recently, as the balance of work and life, which indicates the equilibrium of work with respect to personal life, has drawn increased attention, interest in one's life such as sports after work, during the weekend, or during the free time has increased. As part of the work-life balance, a user's desire for managing his/her health has increased, and to improve the quality of life by investing small time, more and more users have been engaging in various sports activities, such as swimming, gym workout, personal training (PT), golf, pilates, etc.

Meanwhile, due to infectious diseases, etc., the need for restricting the number of people permitted to enter a health center has arisen. Also, it is needed for users to exercise at a predetermined distance from one another according to social distancing.

DISCLOSURE

Technical Problem

The disclosure provides a method and a system for managing an exercise machine to allow a user to exercise by keeping a predetermined distance from another user.

Technical Solution

According to an aspect of the disclosure, there is provided a method, by a server for managing a plurality of exercise machines, of managing the exercise machines, the method including: receiving, from a first exercise machine from among the plurality of exercise machines, a notification that an exercise mode is set; and setting a second exercise machine arranged within a predetermined distance from the first exercise machine from among the plurality of exercise machines in a lock mode.

The method may further include: receiving, from the first exercise machine, a second notification that the exercise mode has ended; and resetting a mode of the second exercise machine as a standby mode or the lock mode, based on modes of peripheral exercise machines arranged within a predetermined distance from the second exercise machine.

The resetting of the mode of the second exercise machine may include: resetting the mode of the second exercise machine as the lock mode, when at least one of the peripheral exercise machines is in the exercise mode; and resetting the mode of the second exercise machine as the standby mode, when the peripheral exercise machines are in the lock mode or the standby mode.

The method may further include resetting a mode of the first exercise machine as the standby mode or the lock mode, based on modes of peripheral exercise machines arranged within a predetermined distance from the first exercise machine.

The resetting of the mode of the first exercise machine may include resetting the mode of the first exercise machine as the lock mode, when a time period of the exercise mode of the first exercise machine is greater than or equal to a first reference time period.

The method may further include, when a time period during which the lock mode is set exceeds a second reference time period, resetting the mode of the first exercise machine as the standby mode or the lock mode.

The method may further include, when a request to output a guide about an exercise machine is received from the external device, determining any one of exercise machines in the standby mode, as the exercise machine to output the guide about.

The method may further include, when a plurality of exercise machines are in the standby mode, determining the exercise machine to output the guide about based on a mode of a peripheral exercise machine arranged within a predetermined distance from the exercise machines in the standby mode.

The method may further include, when a plurality of exercise machines are in the standby mode, determining an exercise machine having many peripheral exercise machines in the lock mode as the exercise machine to output the guide about.

The method may further include transmitting information about the exercise machine to output the guide about to the external device.

The method may further include requesting the exercise machine to output the guide about to output a guide indicator.

The exercise machines may include at least one of aerobic exercise machines and anaerobic exercise machines.

According to an embodiment, a server for managing a plurality of exercise machines includes: a communicator configured to communicate with the plurality of exercise machines; and a processor configured to set a second exercise machine arranged within a predetermined distance from a first exercise machine from among the plurality of exercise machines in a lock mode, when a notification that an exercise mode is set is received, through the communicator, from the first exercise machine from among the plurality of exercise machines.

The processor may further be configured to, when a second notification notifying that an exercise has ended is received from the first exercise machine, reset a mode of the second exercise machine as a standby mode or the lock mode, based on a mode of a peripheral exercise machine arranged within a predetermined distance from the second exercise machine.

The processor may further be configured to, when the peripheral exercise machine is in the exercise mode, set the mode of the second exercise machine as the lock mode, and when the peripheral exercise machine is in the lock mode or the standby mode, reset the mode of the second exercise machine as the standby mode.

The processor may further be configured to reset a mode of the first exercise machine as the standby mode or the lock mode, based on a mode of a peripheral exercise machine arranged within a predetermined distance from the first exercise machine.

The processor may further be configured to set the mode of the first exercise machine as the lock mode, when a time period of the exercise mode of the first exercise machine is greater than or equal to a first reference time period.

Advantageous Effects

A user may exercise by keeping a predetermined distance from another user via controlling of a mode of an exercise machine.

The exercise machine may be guided to evenly operate via the controlling of the mode of the exercise machine.

MODE FOR INVENTION

In the disclosure, general terms that have been widely used nowadays are selected, when possible, in consideration of functions of the disclosure, but non-general terms may be selected according to the intentions of technicians in the this art, precedents, or new technologies, etc. Also, some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure.

The terms, such as "first," "second," etc., may be used to describe various components, but the components shall not be limited by the terms. These terms are only used to distinguish one element from another.

Figure 1:
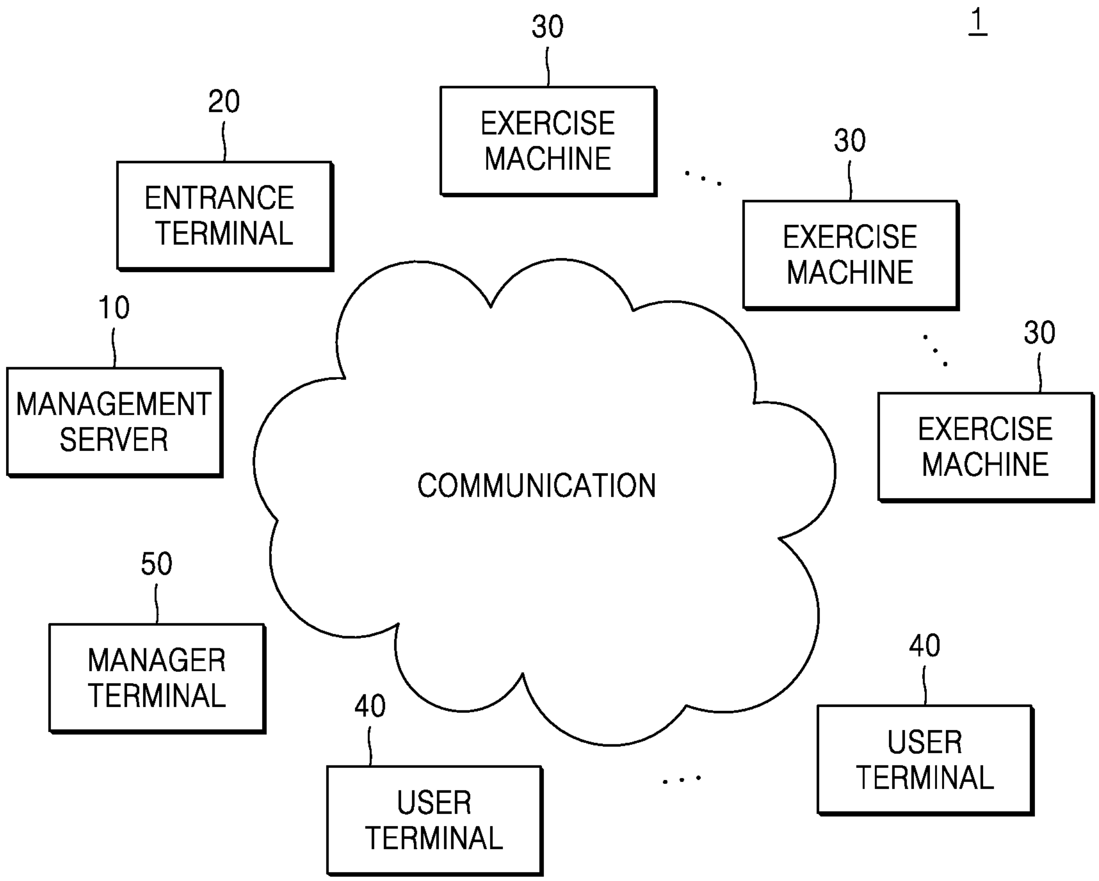
FIG. 1 is a schematic diagram showing an exercise machine management system according to an embodiment.

FIG. 1 is a schematic diagram showing an exercise machine management system 1 according to an embodiment. Referring to FIG. 1, the system 1 may include a management server 10, an entrance terminal 20, an exercise machine 30, a user terminal 40, and a manager terminal 50 connected in a network. In addition, the system 1 may further include a payment server, a contents server, etc. associated with the management server 10.

The network may be realized as various types of wired or wireless networks, such as a local area network (LAN), a wide area network (WAN), a value added network (VAN), a personal area network (PAN), a mobile radio communication network, or a satellite communication network.

The management server 10 may be connected with the entrance terminal 20, the user terminal 40, the manager terminal 50, etc. through the network and capable of data transmission and reception thereto and therefrom, may store an exercise schedule, an exercise type list, etc. of a user in response to a request of the manager terminal 50, may store an exercise result, etc. of the user from information received from the user terminal 40 or the exercise machine 30, and may provide the exercise result to the manager terminal 50 or the user terminal 40 in response to a request of the manager terminal 50 or the user terminal 40.

Also, the management server 10 may control the exercise machine 30, etc. in a health center in response to a request of the user terminal 40 or may use an exercise result received from the exercise machine 30 to generate calorie information, etc. corresponding to an exercise history or the exercise result.

The entrance terminal 20 is arranged in a health center and configured to manage an entrance or an exit of a user. When the entrance terminal 20 receives an entrance request from the user terminal 40, the entrance terminal 20 may determine whether or not to permit entrance of the user according to whether or not the user is registered, an accommodation capacity of the health center, whether or not the user is booked, etc., based on information received from the management server 10, and may transmit a result of the determining to the management server 10 or the user terminal 40. Also, the entrance terminal 20 may provide not only information with respect to permission of entrance, but may also provide, to the user requesting entrance, information with respect to the exercise machine 30 to work on.

The exercise machine 30 may be realized as a weight training machine, a running machine, or the like and may include an exercise body moving according to a movement of a user. Also, the exercise machine 30 may provide an exercise guide to the user under control by the management server 10 and may transmit an exercise result of the user to the management server 10. The exercise machine 30 may be set in various modes according to a manipulation of the user or under control by the management server 10.

The user terminal 40 may be registered in the management server 10 to receive an exercise management service and may be configured to transmit and receive data by accessing the management server 10, the entrance terminal 20, the exercise machine 30, etc. through a wired or wireless network. The user terminal 40 may include a smartphone, a personal computer (PC), a tablet PC, a notebook computer, a smart television (TV), a cellular phone, a personal digital assistant (PDA), a laptop, a media player, a micro-management server 10, a global positioning system (GPS) device, an electronic book reader, a digital broadcasting terminal, a navigation device, a digital camera, a wearable device and other mobile or immobile computing devices, and a smart band. However, the disclosure is not limited thereto. Here, the user terminal 40 may denote not only a terminal owned by a user receiving an exercise management service, but may also denote a predetermined terminal through which the registered user may access the management server 10 and perform a login operation.

The manager terminal 50 may be registered in the management server 10 to provide an exercise management service and may be configured to transmit and receive data by accessing the management server 10 through a wired or wireless network. The manager terminal 50 may include a smartphone, a PC, a tablet PC, a notebook computer, a smart TV, a cellular phone, a PDA, a laptop, a media player, a micro-management server 10, a GPS device, an electronic book reader, a digital broadcasting terminal, a navigation device, a digital camera, and a wearable device and other mobile or immobile computing devices. However, the disclosure is not limited thereto. Here, the manager terminal 50 may denote not only a terminal owned by a manager registered in the management server 10, but may also denote a predetermined terminal through which the registered manager may access the management server 10 and perform a login operation.

Figure 2:
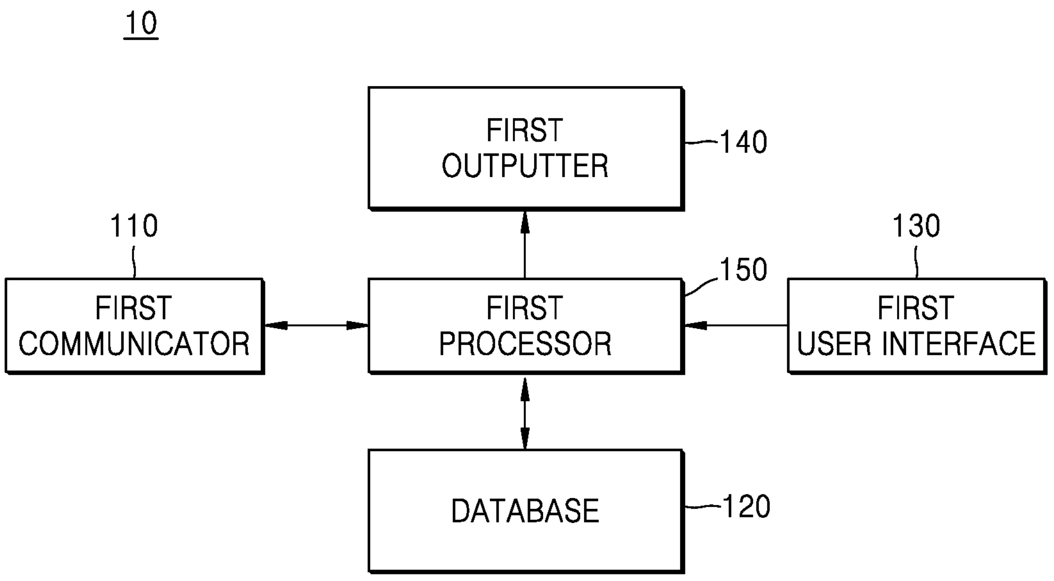
FIG. 2 is a block diagram showing a management server according to an embodiment.

FIG. 2 is a block diagram showing the management server 10 according to an embodiment. Referring to FIG. 2, the management server 10 may include a first communicator 110 communicating with an external terminal, for example, the entrance terminal 20, the exercise machine 30, the user terminal 40, the manager terminal 50, etc. through a network, a database 120 storing information about a user's exercise program, a user's exercise history, an entrance list of a health center, a mode of the exercise machine 30, etc., a first user interface 130 receiving a user command of a manger, etc. managing the management server 10, a first outputter 140 displaying or notifying a state of the heath center, and a first processor 150 performing general functions of the management server 20. The first processor 150 may generate the exercise program of the user, manage a use situation of the center, or set the mode of the exercise machine 30 in response to a request of the manager terminal 50.

Although not shown in the drawing, the entrance terminal 20, the manager terminal 50, and the user terminal 40 may also include a communicator, a storage, a user interface, a processor, etc.

Figure 3:
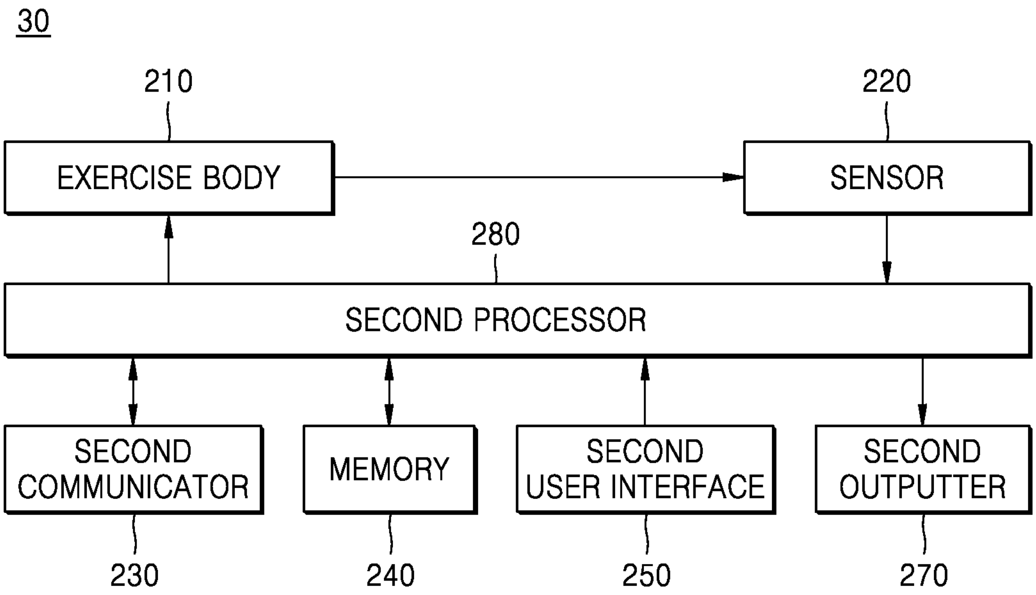
FIG. 3 is a block diagram showing an exercise machine according to an embodiment.

FIG. 3 is a block diagram showing the exercise machine 30 according to an embodiment. The exercise machine 30 according to an embodiment may include an aerobic exercise machine or an anaerobic exercise machine. For example, the exercise machine 30 may include aerobic exercise machines, such as a treadmill, a bicycle, an elliptical trainer, a stair exercise machine, etc., or anaerobic exercise machines, such as a chest press machine, a shoulder press machine, an arm curl machine, a lat pull down machine, a pec deck fly machine, a seated row machine, a long pull machine, a chinning dipping machine, a leg curl machine, a leg extension machine, a leg press machine, an inner thigh machine, an outer thigh machine, a total him machine, a torso back extension machine, an abdominal machine, etc.

The exercise machine 30 may include an exercise body 210, a sensor 220, a second communicator 240, a memory 250, a second user interface 260, a second outputter 270, and a second processor 280.

The exercise body 210 is a physical exercise machine configured to move according to a movement of a user. The exercise body 210 according to an example may add, decrease, or maintain a load according to a configured exercise level. The exercise body 210 may vary according to a type of the exercise machine 30.

The sensor 220 may sense movements of components included in the exercise body 210 and may transmit a result of the sensing to the second processor 280. The sensor 240 may include a laser sensor 220, a motion sensor, a gyro sensor, etc.

The second communicator 240 may communicate with an external device, for example, the management server 10, the entrance terminal 20, another exercise machine 30, the user terminal 40, the manager terminal 50, etc. The second communicator 240 may communicate with the management server 10 through various types of wired or wireless networks, such as a LAN, a WAN, a VAN, a PAN, a mobile radio communication network, a satellite communication network, etc. Also, the second communicator 240 may communicate with the entrance terminal 20, the user terminal 40, and the manager terminal 50 through a short-range wireless communication network, such as a LAN, a PAN, etc. By doing so, the exercise machine 30 may be prevented from being controlled by other external devices, except for the management server 10. However, the disclosure is not limited thereto. According to cases, the second communicator 240 may remotely communicate with the manager terminal 50.

The memory 250 may store various information used by at least one component (for example, the second processor 280 or the sensor 220) included in the exercise machine 30. The information may include, for example, software (for example, a program), and input data or output data with respect to a command related to the software. The memory 250 may include a volatile memory 250 or a nonvolatile memory 250. For example, the memory 250 may include an adjustable exercise range or a threshold exercise range predetermined according to user information.

The second user interface 250 may receive a command or data to be used by the exercise machine 30 from the outside (for example, a user) of the exercise machine 30. The second user interface 250 may include, for example, a microphone, a mouse, a keyboard, an electronic tag, or a digital pen (for example, a stylus pen). For example, a user may input user information through the second user interface 250. For example, the user information may include one or more from among a user's name, age, gender, height, weight, and exercise history.

The second outputter 270 may provide output information. The output information according to an example may be the user information, user's exercise information, or information for guiding a user's exercise. For example, the second outputter 270 may include a display for displaying the output information. Also, the second outputter 270 may be physically or electrically connected to the exercise body 210. For example, the display may be mounted on a frame structure of the exercise body 210. However, the disclosure is not limited thereto, and the display 60 may include a second communicator 230 and may be connected with the exercise body 210 to receive a predetermined signal from the exercise body 210, even when the display 60 is arranged to be apart from the exercise body 210.

The second processor 280 may generally control the exercise machine 30 and may control the second communicator 240 to perform communication with an external device. The second processor 280 may execute, for example, software (for example, a program) to control at least another component (for example, a hardware or software component) connected with the second processor 280 and to perform various data processing or calculating operations. According to an embodiment, at least as part of the data processing or calculating operations, the second processor 280 may load a command or data received from another component (for example, the sensor 220 or the second communicator 230) in the volatile memory of the memory 250, process the command or data stored in the volatile memory, and store resultant data in the nonvolatile memory of the memory 250. The function of the second processor 280 is to be described in detail below.

Figure 4:
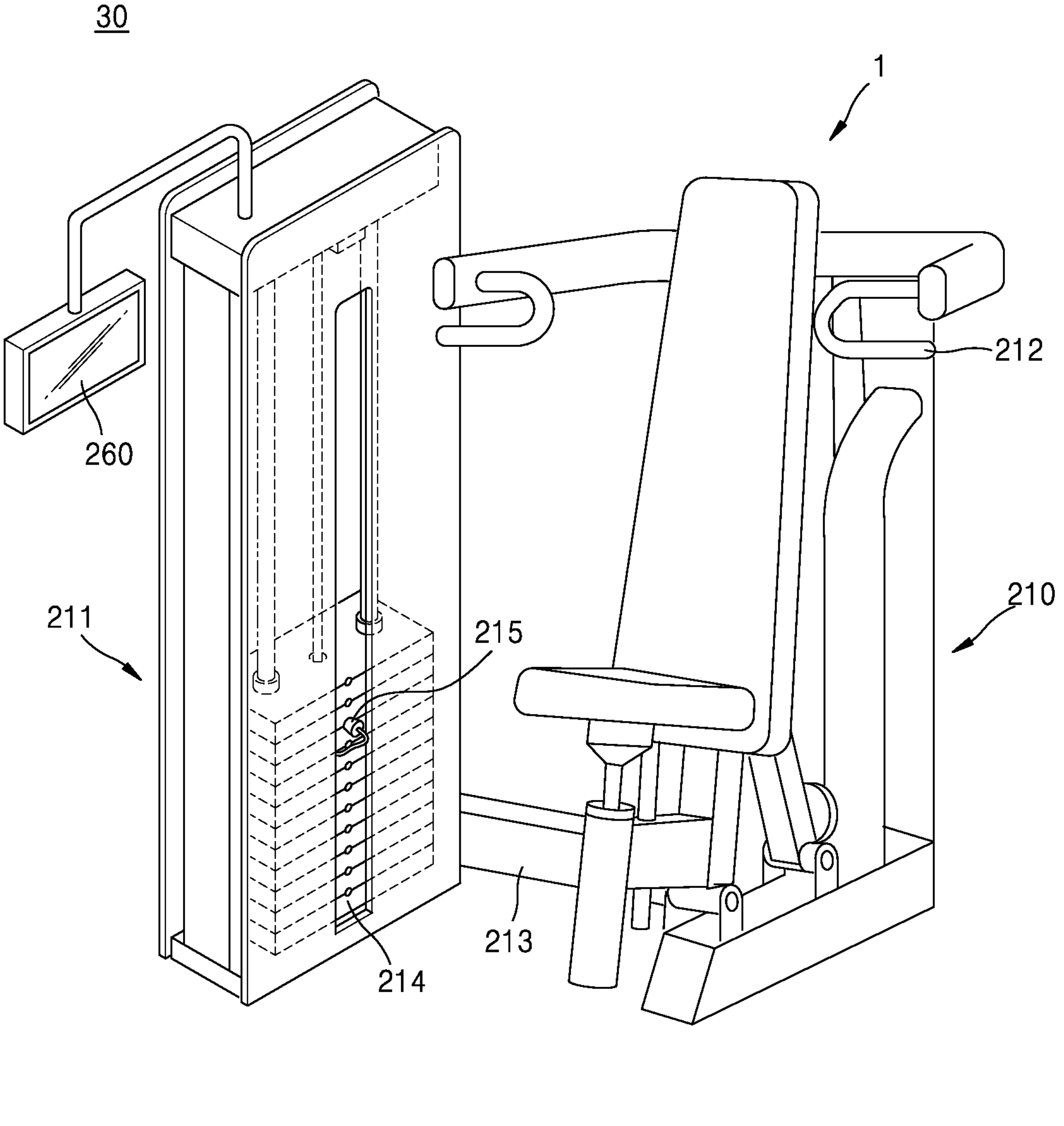
FIG. 4 is a diagram showing an external shape of an exercise machine according to an embodiment.

FIG. 4 is a diagram showing an external shape of the exercise machine 30 according to an embodiment. The exercise body 210 illustrated in FIG. 4 may include a weight machine. The exercise body 210 according to an example may include a load applier 211 adding, decreasing, or maintaining a load according to a configured exercise level, a user manipulation portion 212, and a load transmitter 213.

The load applier 211 according to an example may be realized as a mechanical structure as illustrated in FIG. 4 and may include a plurality of weight plates 214. Here, the load applier 211 may adjust the number of plurality of weight plates 214 moving in a predetermined direction, so as to add, decrease, or maintain the load according to the configured exercise level.

However, the disclosure is not limited thereto, and the load applier 211 may be realized as an electronic structure, according to an example. Here, the load applier 211 may include an electric motor and may add, decrease, or maintain the load according to a control signal applied to the electric motor.

The user manipulation portion 212 according to an example may move together with a movement of the user. In this specification, the user manipulation portion 212 may be defined as an arbitrary component which may be move together with a user by being supported by the user, while the user moves in resistance to the load. For example, the user manipulation portion 212 may be realized as a handle which may be gripped by a user, as illustrated in FIG. 4. Also, when the exercise machine 30 according to an embodiment is configured for a leg exercise, the user manipulation portion 212 may be realized in the form of a leg support configured to support a user's leg and move together.

Also, the user manipulation portion 212 may move in a predetermined direction according to a movement of the user. Here, the predetermined direction may be a gravitational direction or a direction opposite thereto. However, the predetermined direction is not limited thereto and may be oblique with respect to the gravitational direction. For example, the predetermine direction may be inclined by 45 degrees of less with respect to the gravitational direction or the opposite direction thereof. Also, the predetermined direction may be a clockwise direction or a counter clockwise direction rotating based on an axis.

The load transmitter 213 according to an embodiment may transmit the load applied by the load applier 211 to the user manipulation portion 212. The load transmitter 213 may be arranged between the load applier 211 and the user manipulation portion 212 and may be defined as an arbitrary component configured to transmit a load between the load applier 211 and the user manipulation portion 212. For example, the load transmitter 213 may be realized as a wire arranged between the load applier 211 and the user manipulation portion 212 and a plurality of pulleys connected with the wire for a direction switch.

The sensor 220 may be configured to sense movement information of the user manipulation portion 212. For example, the sensor 220 may be provided to include a distance sensing sensor 220, for example, a laser sensor 220 arranged at the user manipulation portion 212, and a reflecting portion arranged at a fixed support, and may directly sense the movement information of the user manipulation portion 212. Also, the sensor 220 according to an example may not only directly sense a movement range of the user manipulation portion 212, but may also indirectly sense the movement range of the user manipulation portion 212 by sensing movements of the load applier 211 and the load transmitter 213 connected with the user manipulation portion 212. For example, the sensor 220 may be arranged on a pin structure 112 supported by one or more of the plurality of weight plates 214 and may sense a movement of the plurality of weight plates 214, and thus, may sense the movement of the user manipulation portion 212 connected with the plurality of weight plates 214. Also, as another example, the sensor 220 may sense movement information of the wire included in the load transmitter 213 or may sense rotation information of the pulley connected with the wire so as to sense the movement of the user manipulation portion 212 connected with the load transmitter 213.

With reference to FIG. 4, as the exercise machine 30, a weight exercise machine 30 is described. However, it is not limited thereto. The exercise machine 30 may include various exercise machines, such as aerobic exercise machines, for example, a treadmill, a bicycle, a stepper, a whole body exercise machine, etc., or weight exercise machines.

The exercise machine 30 according to an embodiment may operate in various modes. For example, modes of the exercise machine 30 may include an exercise mode, a standby mode, and a lock mode.

The exercise mode is a mode in which the exercise body 210 of the exercise machine 30 moves according to a movement of a user or according to an exercise program. The exercise mode may be set by a user's manipulation. For example, a user command to switch to the exercise mode may be input through the second user interface 260 of the exercise machine 30, or a switch to the exercise mode may be requested by the user terminal 40, etc. For example, when a user performs a login operation to the exercise machine 30, the exercise machine 30 may determine that a request to switch to the exercise mode is received and may set the mode of the exercise machine as the exercise mode.

When the exercise mode is set, the exercise machine 30 may request, from the management server 10, an exercise program appropriate for the user, based on user information, and may receive the exercise program from the management server 10. Also, the exercise machine 30 may provide an exercise guide for helping the user appropriately exercise. Also, the exercise machine 30 may store an exercise result of the user, such as a user's exercise intensity, exercise time, exercise amount, etc. during the exercise mode. Also, when the exercise mode has ended, the exercise machine 30 may transmit the exercise result to the management server 10.

The standby mode may denote a mode in which the exercise body 210 does not move, but the exercise body 210 may be switched to the exercise mode according to a user manipulation, etc. It is described that the exercise body 210 does not move in the standby mode, but it is not limited thereto. In the standby mode, even when the exercise body 210 moves according to a movement of the user, the user may not be guided about an exercise program, or an exercise result of the user may not be stored or transmitted. When the exercise body 210 moves according to the movement of the user in the standby mode, the exercise machine 30 may output, through the second outputter 270, an indicator indicating a request to switch to the exercise mode. The exercise mode may be switched into only when the exercise machine 30 is in the standby mode.

The lock mode may be a mode in which the exercise body 210 does not move and does not switch to the exercise mode even when a request to switch to the exercise mode is received according to a user's manipulation, etc. Thus, the exercise body 210 of the exercise machine 30 may not move according to the movement of the user. However, it is not limited thereto. In the lock mode, even when the exercise body 210 moves according to the movement of the user, the user may not be guided about an exercise program, or an exercise result of the user may not be stored or transmitted. Also, when the exercise body 210 moves according to the movement of the user in the lock mode, the exercise machine 30 may output, through the second outputter 270, an indicator indicating a request to stop exercising. Alternatively, when the user attempts to move the exercise body 210 in the lock mode, the second processor 280 may control the components of the exercise body 210 such that the exercise body 210 does not move.

The exercise mode may be set by a user's manipulation (here, the user's manipulation denotes a user command through the second user interface 260 or a user command received from the user terminal 40 through the second communicator 240), and the standby mode or the lock mode may be set by the management server 10.

Figure 5:
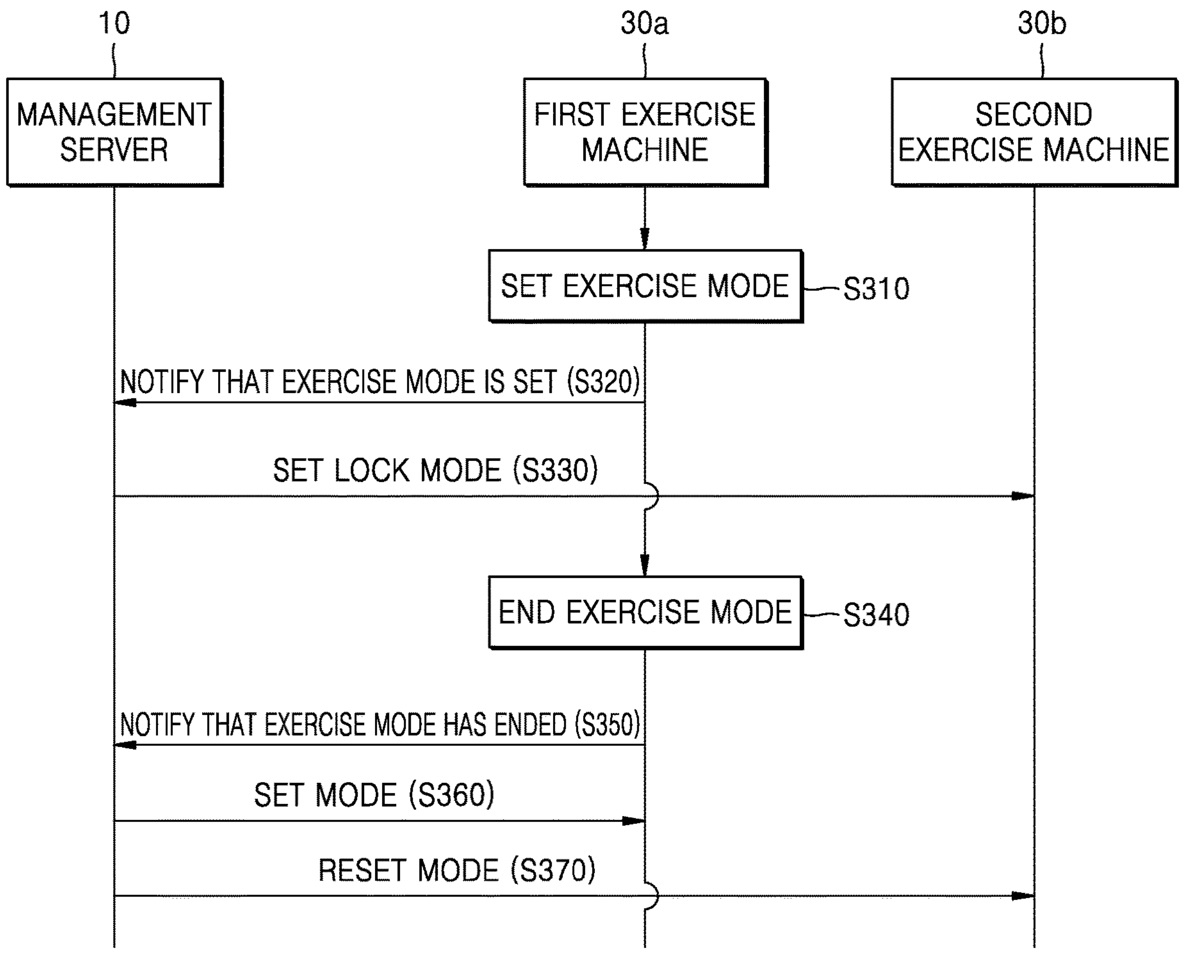
FIG. 5 is a reference diagram for describing a method of setting a mode of an exercise machine, according to an embodiment.

FIG. 5 is a reference diagram for describing a method of setting a mode of the exercise machine 30, according to an embodiment.

Referring to FIG. 5, a first exercise machine 30*a* from among the plurality of exercise machines 30 arranged in a health center may be set in an exercise mode in operation S310. For example, a user may approach the first exercise machine 30*a* in a standby mode and may input a user command to switch to the exercise mode, through the second user interface 260 of the first exercise machine 30*a*. Alternatively, when a user command to select the first exercise machine 30*a* from among exercise machines displayed on a display of the user terminal 40 is received, the second processor 280 of the first exercise machine 30*a* may set a mode of the first exercise machine 30*a* in the standby mode as the exercise mode.

When the first exercise machine 30*a* is set in the exercise mode, the first exercise machine 30*a* may transmit, to the management server 10, a notification notifying that the exercise mode is set. The first exercise machine 30*a* may transmit, to the management server 10, user information of the user switching the first exercise machine 30*a* to the exercise mode, together with the notification described above transmitted to the management server 10. Then, the management server 10 may read an exercise program of the first exercise machine 30*a* matching the user information stored in the database 120 and transmit the exercise program to the first exercise machine 30*a*, and thus, the first exercise machine 30*a* may obtain the exercise program. Also, in the exercise mode, the first exercise machine 30*a* may provide an exercise guide for helping the user exercise according to the exercise program.

In addition, the management server 10 may set a second exercise machine 30 arranged at a predetermined distance from the first exercise machine 30*a* in a lock mode in operation S330. Here, the predetermined distance may be a distance to maintain a pleasant exercise environment of a health center or a distance to prevent the diffusion of infectious diseases. The predetermined distance may be changed by a manager managing the health center. In the health center, there may be one or more exercise machines within a predetermine distance from the first exercise machine 30*a*. For convenience of explanation, it is described solely based on a second exercise machine 30*b*, but it is not limited thereto. When there are a plurality of exercise machines arranged within the predetermined distance from the first exercise machine 30*a*, the management server 10 may set all of the plurality of exercise machines in the lock mode.

The exercise mode of the first exercise machine 30*a* may be terminated in operation S340. When the user finishes exercising according to the exercise program, the second processor 280 of the first exercise machine 30*a* may end the exercise mode. However, it is not limited thereto. The second processor 280 of the first exercise machine 30*a* may end the exercise mode, according to user's manipulation.

When the exercise mode of the first exercise machine 30*a* has ended, the first exercise machine 30*a* may transmit, to the management server 10, a notification notifying that the exercise mode has ended, in operation S350. While the first exercise machine 30*a* transmits the notification, the first exercise machine 30*a* may also transmit an exercise result of the user to the management server 10. The management server 10 may store the exercise result in the database 120 by matching the exercise result with the user information. Alternatively, the first processor 150 of the management server 10 may store the exercise result in the database by converting the exercise result into calories. The management server 10 may transmit the stored exercise result, etc. to an external device, for example, the user terminal 40 or the manager terminal 50.

The management server 10 may set the mode of the first exercise machine 30*a* in operation S360 and reset the mode of the second exercise machine 30*b* arranged at a predetermined distance from the first exercise machine 30*a* in operation S370. For example, the management server 10 may set a mode of the second exercise machine 30*b* as the lock mode or the standy mode based on the mode information of another exercise machine (hereinafter, it may be referred to as a "peripheral exercise machine") arranged at a predetermined distance from the second exercise machine 30*b*.

As described above, the management server 10 may set the mode of the peripheral exercise machine based on the mode of the exercise machine 30, and thus, the user may exercise by keeping a predetermined distance from another user. With reference to FIG. 5, a method of setting a mode of another exercise machine based on a mode of one exercise machine is described. However, the disclosure is not limited thereto. A plurality of exercise machines may be arranged in a health center, and the management server 10 may simultaneously manage the plurality of exercise machines 30.

FIGS. 6A to 6D are reference diagrams for describing a method, performed by the management server 10, of managing a mode of the exercise machine 30.

Figure 6A:
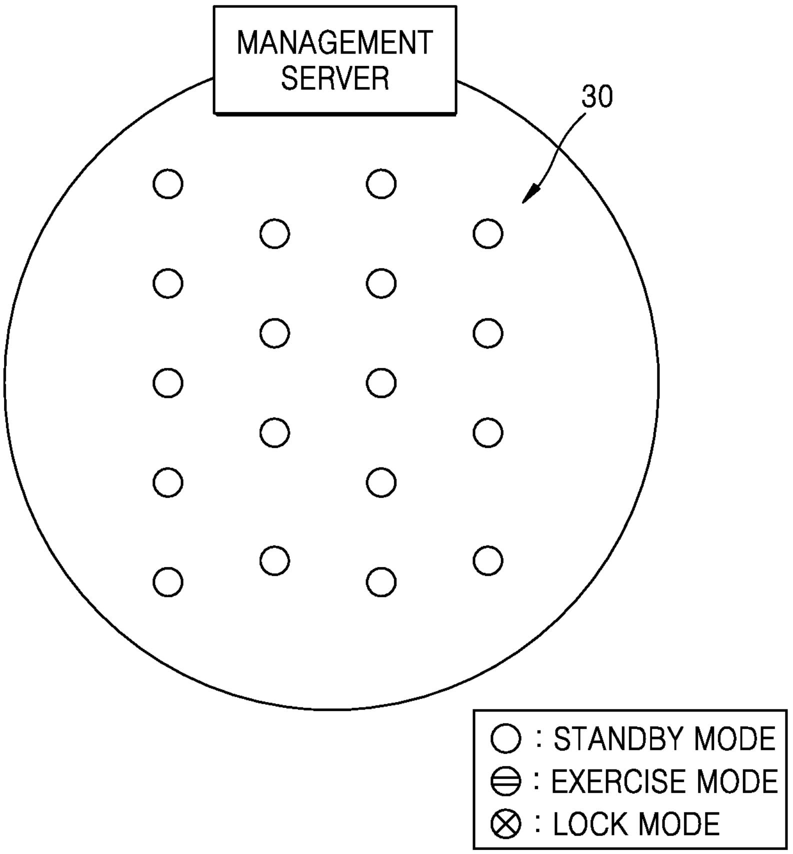
FIGS. 6A to 6D are reference diagrams for describing a method, performed by a management server, of managing a mode of an exercise machine.

When no user is exercising in a health center, the management server 10 may set modes of all exercise machines 30 arranged in the health center as standby modes, as illustrated in FIG. 6A.

Figure 6B:
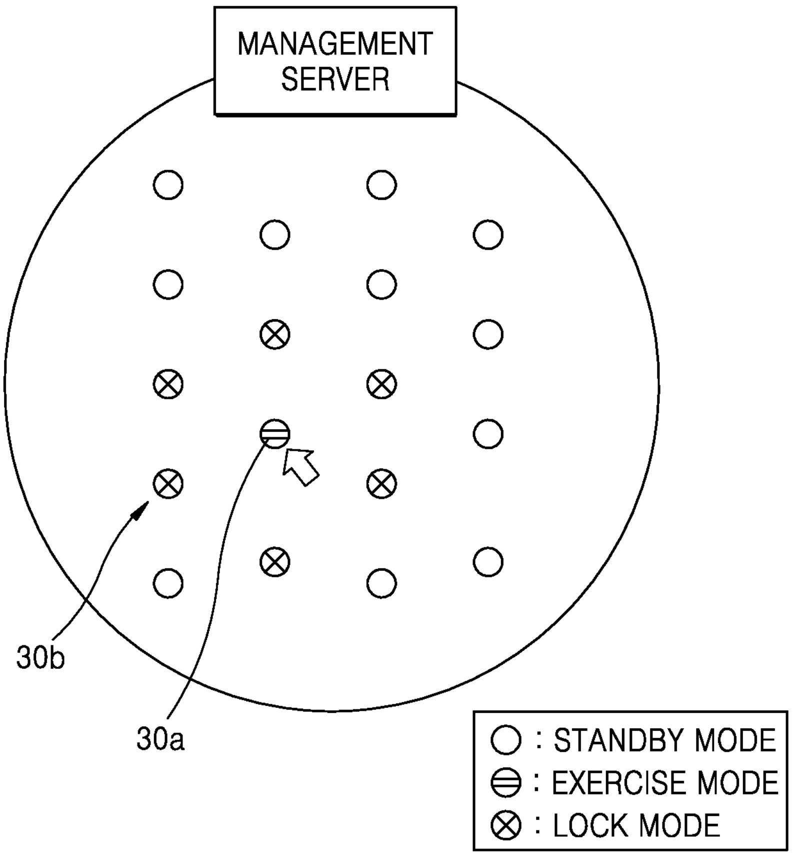

A user may enter the health center and may set a mode of any one exercise machine 30 form among the exercise machines 30 as an exercise mode. For example, as illustrated in FIG. 6B, the user may set the first exercise machine 30*a* in the exercise mode. As the first exercise machine 30*a* is switched to the exercise mode, the first exercise machine 30*a* may transmit a corresponding result to the management server 10. The management server 10 may control the second exercise machine 30*b* within a predetermined distance from the first exercise machine 30*a* switched to the exercise mode, such that a mode of the second exercise machine 30*b* is set as a lock mode.

Figure 6C:
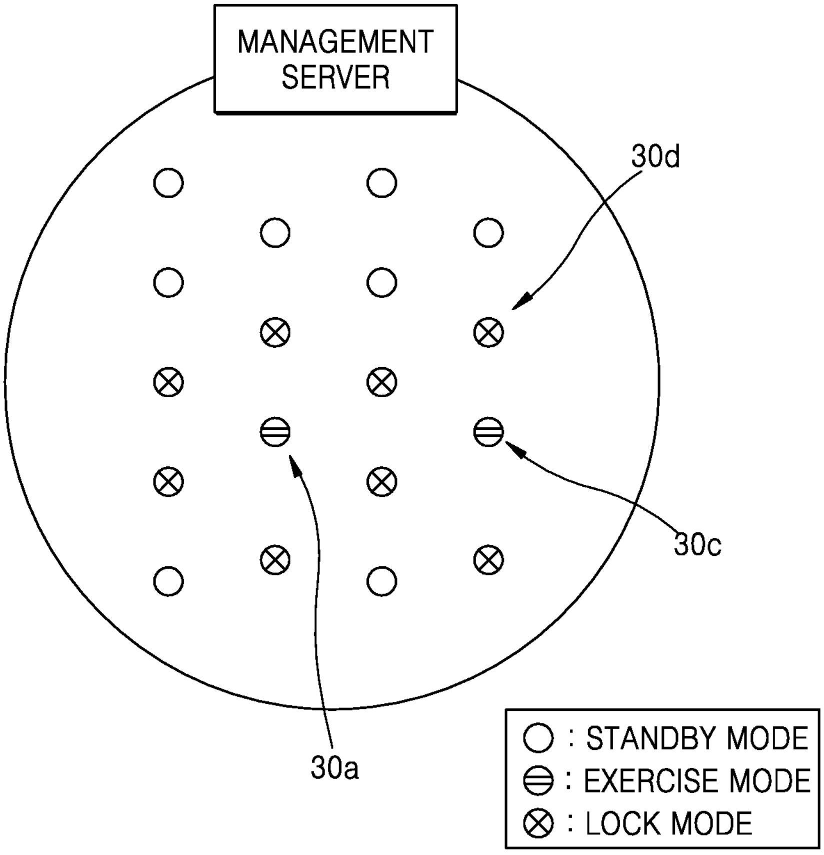

As illustrated in FIG. 6C, another user may set a mode of a third exercise machine 30*c* from among the exercise machines 30 set in the standby mode as the exercise mode. Then, the third exercise machine 30*c* may be switched to the exercise mode and may transmit a corresponding result to the management server 10. The management server 10 may control a fourth exercise machine 30*d* within a predetermined distance from the third exercise machine 30*c*, such that a mode of the fourth exercise machine 30*d* is set as the lock mode.

Figure 6D:
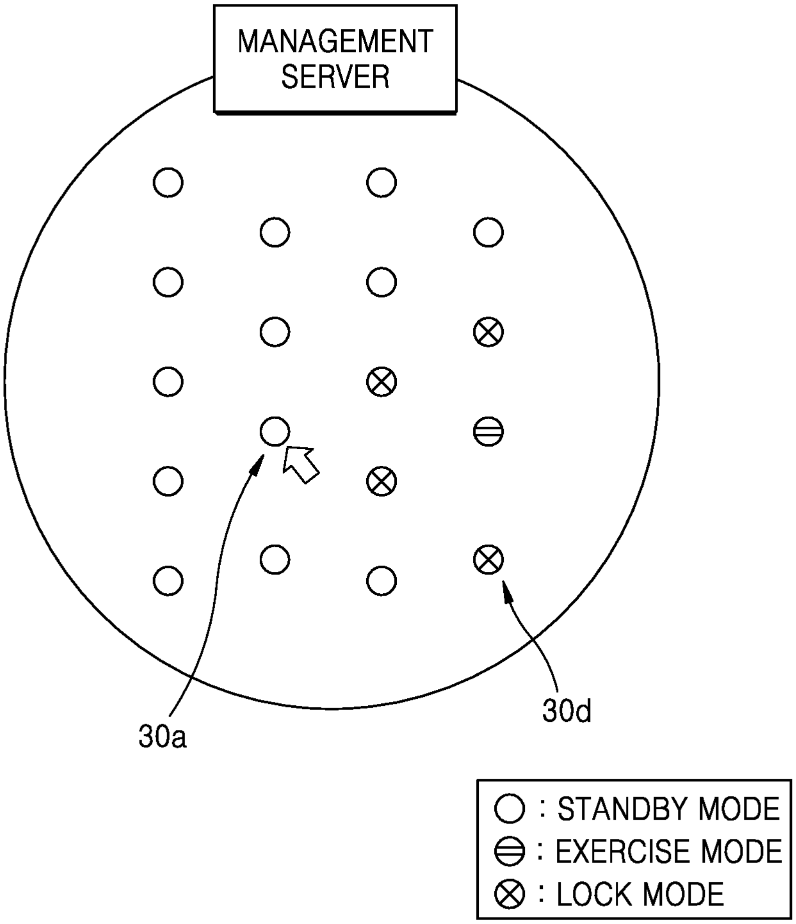

The exercise mode of the first exercise machine 30*a* may be ended. The first exercise machine 30*a* may transmit, to the management server 10, a notification that the exercise mode has ended. The management server 10 may determine, based on a mode of a peripheral exercise machine within a predetermined distance from the first exercise machine 30*a*, a mode of the first exercise machine 30*a*. For example, when at least one exercise machine 30*a*, from among the exercise machines 30, within a predetermined distance from the first exercise machine 30*a* is in the exercise mode, the management server 10 may control the mode of the first exercise machine 30*a* to be set in the lock mode. Alternatively, when all of the exercise machines 30 within the predetermined distance from the first exercise machine 30*a* are not set in the exercise mode, that is, the exercise machines 30 within the predetermined distance from the first exercise machine 30*a* are set in the lock mode or the standby mode, the management server 10 may set the first exercise machine 30*a* in the standby mode. FIG. 6D illustrates that the exercise machine 30 within the predetermined distance from the first exercise machine 30*a* is in the standby mode or the lock mode, and thus, the management server 10 may set the mode of the first exercise machine 30*a* as the standby mode.

It has been described so far that the management server 10 may set the exercise machine 30 in the standby mode or the lock mode, but it is not limited thereto. The exercise machine 30 may set the mode of the exercise machine 30 as the standby mode or the lock mode based on the mode of another exercise device arranged at a predetermined distance.

Figure 7:
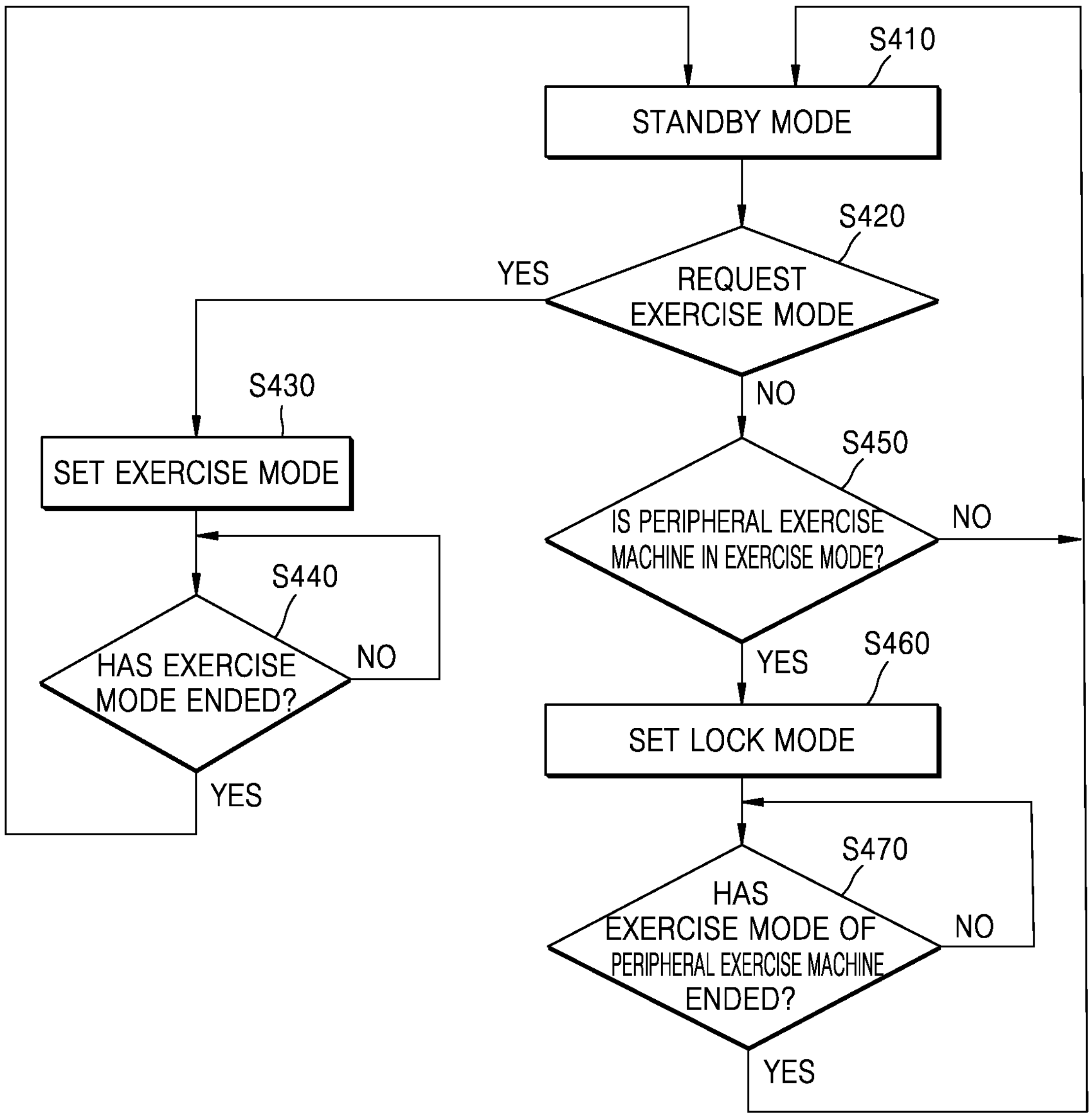
FIG. 7 is a flowchart of a method of determining a mode of an exercise machine, according to another embodiment.

FIG. 7 is a flowchart of a method of determining a mode of an exercise machine, according to another embodiment.

Referring to FIG. 7, the second processor 280 of the exercise machine 30 may set a mode of the exercise machine 30 as a standby mode in operation S410. When a mode of a peripheral exercise machine arranged at a predetermined distance is not an exercise mode, the exercise machine 30 may be set in the standby mode, in general.

The second processor 280 of the exercise machine 30 may determine whether or not a request to set the exercise mode is received, in operation S420. For example, a user may approach the exercise machine 30 in the standby mode and may input a user command to switch to the exercise mode through the second user interface 260 of the exercise machine 30. Alternatively, when a user command to select the exercise machine 30 displayed on a display of the user terminal 40 is input, the second processor 280 of the selected exercise machine 30 may set the mode of the exercise machine 30 in the standby mode as the exercise mode.

When the exercise mode is requested, the second processor 280 of the exercise machine 30 may set the mode as the exercise mode in operation S430. When the exercise mode is set, the exercise machine 30 may transmit a notification notifying that the exercise mode is set, to the management server 10. Then, the management server 10 may read an exercise program of the exercise machine 30 matching user information stored in the database 120 and transmit the exercise program to the exercise machine 30, and thus, the exercise machine 30 may obtain the exercise program. Also, in the exercise mode, the exercise machine 30 may provide an exercise guide for helping the user exercise according to the exercise program and may record an exercise of the user.

The exercise machine 30 may determine whether or not the exercise mode has ended in operation S440. When the user finishes the exercise according to the exercise program, the second processor 280 of the first exercise machine 30*a* may determine that the exercise mode has ended. Alternatively, when a user command to end the exercise mode is input through the second user interface 250, the second processor 280 of the exercise machine 30 may end the exercise mode.

The second processor 280 of the exercise machine 30 may also determine whether or not a peripheral exercise machine is in the exercise mode in operation S450. The peripheral exercise machine may denote an exercise machine arranged within a predetermined distance.

When the peripheral exercise machine is in the exercise mode (S450—yes), the second processor 280 of the exercise machine 30 may set the mode as a lock mode in operation S460. As the lock mode is set, a user exercising on the peripheral exercise machine may exercise by maintaining a predetermined distance from another user.

Also, the second processor 280 of the exercise machine 30 may determine whether or not the exercise mode of the peripheral exercise machine has ended in operation S470. When the exercise mode of the peripheral exercise machine has ended, the peripheral exercise machine may transmit a corresponding result to the exercise machine 30. Then, the exercise machine 30 may determine that the exercise mode of the peripheral exercise machine has ended.

When there are no peripheral exercise machines set in the exercise mode, that is, the exercise modes of all peripheral exercise machines are ended, the exercise machine 30 may set the mode as the standby mode in operation S410. That is, only when there is no peripheral exercise machine set in the exercise mode, the exercise machine 30 may switch to the standby mode.

With reference to FIG. 7, it is described that the exercise machine 30 may determine whether or not the mode of the exercise machine 30 is set as the exercise mode in operation S420 and may determine whether or not the peripheral exercise machine is set in the exercise mode in operation S450. However, the description is only for convenience of explanation, and the disclosure is not limited thereto. The exercise machine 30 may first determine whether or not the peripheral exercise machine is set in the exercise mode, and then, may determine whether or not the mode of the exercise machine 30 is set as the exercise mode. Whenever the exercise machine 30 switches its mode, the exercise machine 30 may transmit a corresponding result to the management server 10.

It has been described so far that the exercise machine 30 is set in the lock mode, only when the peripheral exercise machine is in the exercise mode. However, it is not limited thereto. The exercise machine 30 may be set in the lock mode for a predetermined time period, only when the exercise mode satisfies a predetermined condition. For example, when the use is concentrated on a predetermined exercise machine 30, the risk of breakdown, etc. of the exercise machine 30 may increase. Thus, in order that the exercise machines 30 are evenly used, the exercise machine 30 may be set in the lock mode for a predetermined time period.

Figure 8:
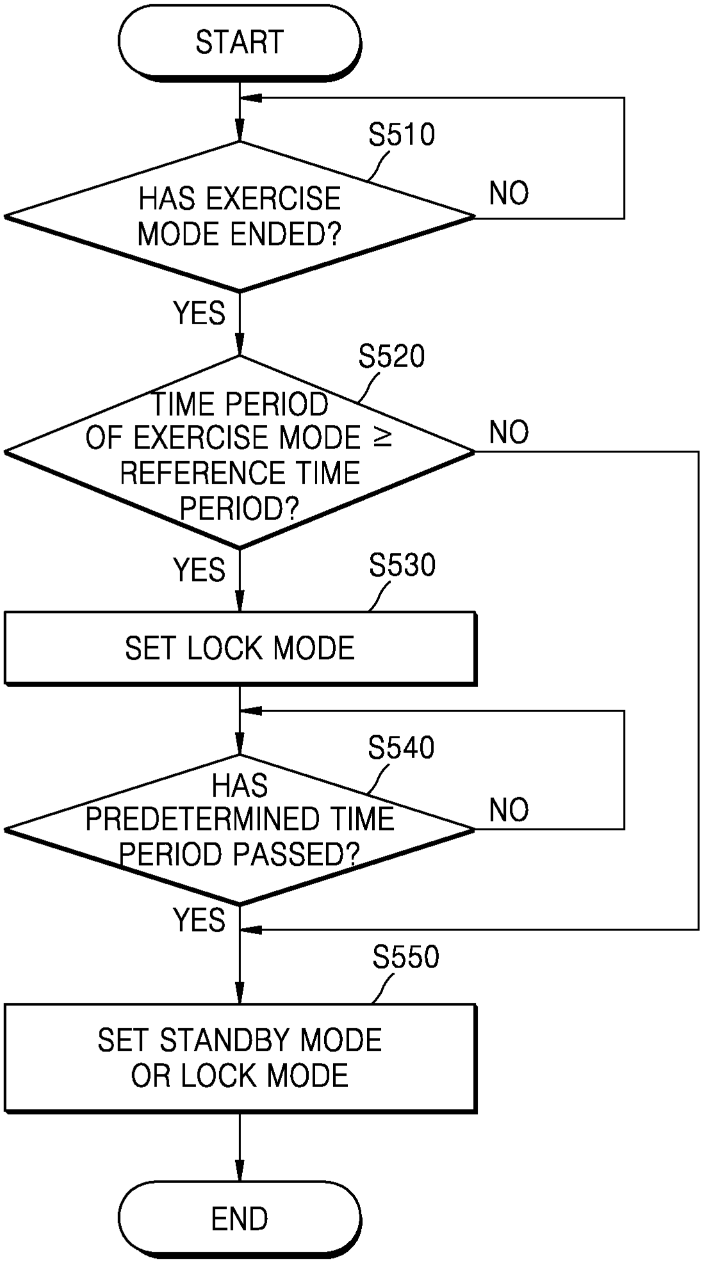
FIG. 8 is a flowchart of an operation, performed by an exercise machine, of maintaining a lock mode according to an embodiment.

FIG. 8 is a flowchart of an operation, performed by an exercise machine, of maintaining a lock mode according to an embodiment.

The exercise machine 30 may determine whether or not the exercise mode has ended, in a state in which the exercise mode 30 is set in the exercise mode, in operation S510.

When it is determined that the exercise mode has ended (S510—yes), the second processor 280 of the exercise machine 30 may determine whether or not a time period of the exercise mode is greater than or equal to a reference time period in operation S520.

The time period of the exercise mode may indicate a time span during which the exercise machine 30 is set in the exercise mode after being set in the exercise mode. However, it is not limited thereto. The time period of the exercise mode may mean a total time previously set in the exercise mode, for example, a four-hour time period, at the time of determination in operation S520. The time period of the exercise mode may be set by the manager of the health center, etc. The reference time period may also be set by the manager of the health center, etc. and may indicate a reference time period with respect to the time period of the exercise mode set once or a reference time period with respect to the time period of the exercise mode based on a predetermined time point.

When the time period of the exercise mode is less than the reference time period (S520—no), the second processor 280 of the exercise machine 30 may set a mode of the exercise machine 30 as the standby mode or the lock mode based on a mode of the peripheral exercise mode in operation S550.

However, when the time period of the exercise mode is greater than or equal to the reference time period (S520—yes), the second processor 280 of the exercise machine 30 may set the mode as the lock mode (S530). This is because there is a risk of breakdown, etc. of the exercise body, due to overload of movements in the exercise mode, so that it is required to set the lock mode for a predetermined time period.

Also, when the a predetermined time period passes (S540—yes), the second processor 280 of the exercise machine 30 may set the mode of the exercise machine 30 as the standby mode or the lock mode based on the mode of the peripheral exercise mode in operation S550.

With reference to FIG. 8, it is described that the exercise machine 30 sets the mode of the exercise machine 30 as the lock mode, but it is not limited thereto. When the time period of the exercise mode of the exercise machine 30 is greater than or equal to the reference time period, the management server 10 may set the mode of the exercise machine 30 as the lock mode. Also, after a predetermined time period passes, the management server 10 may set the mode of the exercise machine 30 as the standby mode or the lock mode based on the mode of the peripheral exercise machine.

When a plurality of exercise machines of the same exercise type are in the standby mode, the user may select one of the exercise machines 30 set in the standby mode and set the exercise mode. However, it is not limited thereto. The management server 10 may assign a priority order to any one exercise machine 30 from among the plurality of exercise machines 30 and may guide the user to use an exercise machine 30 having a high priority order.

Figure 9:
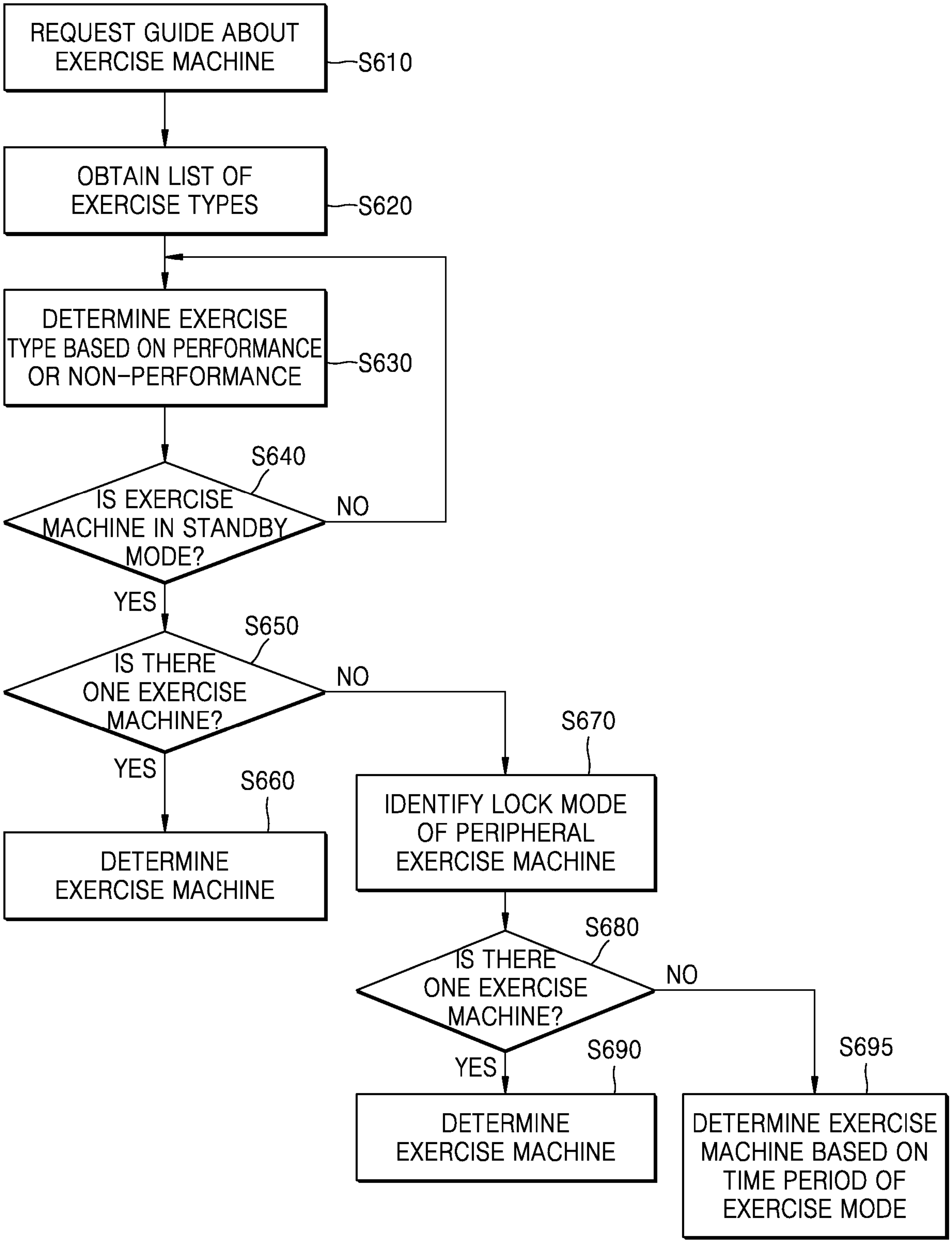
FIG. 9 is a flowchart of a method of providing a guide about an exercise machine, according to an embodiment.

FIG. 9 is a flowchart of a method of providing a guide about an exercise machine, according to an embodiment.

The first processor 150 of the management server 10 may receive a request to output a guide about the exercise machine 30 from an external device through the first communicator 110 in operation S610. The external device may be the user terminal 40, the entrance terminal 20, or another exercise machine 30. For example, when the entrance terminal 20 permits entrance of a user, the entrance terminal 20 may request the management server 10 to guide the user with respect to the exercise machine 30. Alternatively, the user terminal 40 may request a guide with respect to the exercise machine 30 after entering into a health center, and an exercise machine having ended an exercise mode may request a guide about a next exercise machine.

When the guide about the exercise machine is requested, the first processor 150 of the management server 10 may obtain a list of exercise types of a user in operation S620. The first processor 150 of the management server 10 may read, from the database 120, the list of exercise types corresponding to user information received from the external device. Here, the exercise types may be names of exercise machines, such as a treadmill, a bicycle, a stepper, etc. The database 120 may pre-store the list of exercise types matching user information. When a notification that the user has finished exercising is received from the external device, the first processor 150 may update the list of exercise types with respect to whether or not an exercise is performed, etc.

The first processor 150 of the management server 10 may determine an exercise type based on whether or not an exercise type from the list of exercise types is performed, in operation S630. The list of exercise types read from the database 120 may also include whether or not the exercise types are performed.

The first processor 150 of the management server 10 may determine an exercise type from the list of exercise types, the item not being performed. Here, a reference for non-performance may be stored by being pre-determined by the user, a manager, etc. For example, the non-performance of an exercise type may be reset whenever the health center is entered into. That is, when the user enters into the health center, all of the list of exercise types is reset as not being performed, and the user may exercise on the exercise machines included in the list of exercise types. However, it is not limited thereto. A period of resetting the non-performance may be configured, for example, as every two days. Thus, after two days pass, the exercise types in the list of exercise types may be reset as not being performed. This may be useful when the user is to perform various types of exercises by dividing the exercises into time periods. Furthermore, whenever it is requested by the user or the manager, the management server 10 may reset the list of exercise types as not being performed.

The first processor 150 of the management server 10 may determine, based on the performance or the non-performance of an exercise type, an exercise type corresponding to an exercise machine with respect to which the user is to be guided. When there are a plurality of exercise types not performed, the management server 10 may determine an exercise type included in an upper end of the list of exercise types, as the exercise type corresponding to the exercise machine with respect to which the user is to be guided. It is because when a user or manager sets the list of exercise types, the user or manager may generally include an exercise type to perform first in the upper end of the list.

The first processor 150 of the management server 10 may determine whether the exercise machine corresponding to the exercise type determined in operation S630 is in a standby mode in operation S640.

When no exercise machine corresponding to the determined exercise type is in the standby mode, the management server 10 may determine another exercise type not performed from the list of exercise types. For example, when a "treadmill" and a "weight machine" from the list of exercise types are exercise types not performed, and all exercise machines corresponding to the "treadmill" arranged in the health center are not in the standby mode, the management server 10 may determine whether or not the exercise machine 30 corresponding to the "weight machine" is in the standby mode.

When all exercise machines corresponding to the exercise types not performed are not in the standby mode, the management server 10 may notify to the user that the exercise machines are not available, through the external device (for example, the entrance terminal 20, the user terminal 40, and the other exercise machine 30). Then, the user may wait or request, through the external device, the management server 10 to output a guide about an exercise machine not included in the list of exercise types.

Alternatively, while the management server 10 may notify to the user that the exercise machine 30 is not available, through the external device (for example, the entrance terminal 20, the user terminal 40, and the other exercise machine 30), the management server 10 may recommend the exercise machine 30 equivalent to the exercise type not performed. For example, when all exercise machines corresponding to the "treadmill" are not in the standby mode, the management server 10 may recommend, to the user, a "bicycle," which is another type of aerobic exercise.

When the exercise machine corresponding to the exercise type not performed is in the standby mode (S640—yes), and the number of exercise machines 30 in the standby mode is one (S650—yes), the first processor 150 of the management server 10 may finally determine this exercise machine 30 as the exercise machine 30 to output a guide about. Also, the management server 10 may also provide, to the user, unique identification information of the exercise machine 30 to output the guide about, for example, a name of the exercise machine 30 and location information of the exercise machine 30 in the health center, through the external device, for example, the entrance terminal 20, a member terminal, or the other exercise machine 30.

In addition, the management server 10 may control the finally determined exercise machine 30 to output a guide indicator. The guide indicator may be an indicator to guide the user to easily identify which exercise machine 30 is to be worked on and guide the movement of the user. For example, the second outputter 270 of the exercise machine 30 may include a display indicating a mode of the exercise machine 30. The display may have different colors according to the mode. For example, in the case of the exercise mode, the display may indicate a white color, and in the case of the standby mode, the display may indicate a green color. Also, in the case of the lock mode, the display may display a black color. In addition, the display may display the guide indicator in red. Alternatively, the display may display the guide indicator as green blinkers.

When there are a plurality of exercise machines 30 in the standby mode (S650—no), the first processor 150 of the management server 10 may identify a lock mode of the peripheral exercise machine in operation S670. For example, the exercise machine 30, a large number of which are in the lock mode within a predetermined distance, may be determined as the exercise machine 30 to output the guide about. This may allow more users to exercise in the health center.

When there is one exercise machine having the maximum number of peripheral exercise machines in the lock mode (S680—yes), the first processor 150 of the management server 10 may finally determine this exercise machine as the exercise machine to output the guide about, in operation S690.

However, when there are a plurality of exercise machines having the maximum number of peripheral exercise machines in the lock mode (S680—no), the first processor 150 of the management server 10 may finally determine the exercise machine 30 to output the guide about, based on a time period of the exercise mode, in operation S695. For example, in the health center, the exercise machine 30 corresponding to the exercise type and set in the standby mode may include a first exercise machine 30 and a second exercise machine 30. Also, when both of the first and second exercise machines have two peripheral exercise machines set in the lock mode with a predetermined distance, the management server 10 may identify the time period of the exercise mode of the first and second exercise machines 30. Also, the exercise machine 30 having a shorter time period of the exercise mode may be finally determined as the exercise machine 30 to output the guide about. When the time periods of the exercise mode are the same as each other, the management server 10 may randomly determine any one of the plurality of exercise machines 30 as the exercise machine to output the guide about.

The method of managing the exercise machine according to the disclosure may be implemented as a computer program executable by various components on a computer, and this computer program may be recorded on a computer-readable medium. Here, the medium may include a magnetic medium, such as a hard disk, a floppy disk, and a magnetic tape, an optical recording medium, such as compact disk (CD)-read-only memory (ROM) and digital versatile disk (DVD), a magneto-optical medium, such as a floptical disk, and a hardware device specially configured to store and execute a program command, such as ROM, random-access memory (RAM), and a flash memory 250. Furthemore, the medium may include an intangible medium implemented as a type to be transmitted on a network, for example, a type of medium which may be implemented as software or an application and transmitted and distributed through the network.

The computer program may be specially designed and configured for the disclosure or may be well-known to and usable by one of ordinary skill in the field of computer software. Examples of the computer program include advanced language codes that may be executed by a computer by using an interpreter or the like as well as machine language codes made by a compiler.

One or more embodiments are described above. It would be understood by one of ordinary skill in the art that the disclosure may be realized in a different form modified within a range not departing from the essential properties of the disclosure. Therefore, the embodiments should be considered in a descriptive sense only and not for purposes of limitation. The scope of the disclosure is defined not by the detailed description of the disclosure but by the appended claims, and all differences within the scope will be construed as being included in the disclosure.

The invention claimed is:

1. A method, by a server for managing a plurality of exercise machines, of managing the exercise machines, the method comprising:

receiving, from a first exercise machine from among the plurality of exercise machines, a notification that the first exercise machine is set in an exercise mode;

setting, in response to receiving the notification that the first exercise machine is set in the exercise mode from the first exercise machine, a second exercise machine different from the first exercise machine and arranged within a predetermined distance from the first exercise machine from among the plurality of exercise machines in a lock mode;

receiving, from the first exercise machine, a second notification that the exercise mode of the first exercise machine has ended; and resetting a mode of the second exercise machine as a standby mode or the lock mode, based on modes of peripheral exercise machines arranged within the predetermined distance from the second exercise machine, wherein the resetting of the mode of the second exercise machine comprises:

resetting the mode of the second exercise machine as the lock mode, when at least one of the peripheral exercise machines is in the exercise mode; and resetting the mode of the second exercise machine as the standby mode, when the peripheral exercise machines are in the lock mode or the standby mode.

2. The method of claim 1, further comprising resetting a mode of the first exercise machine as the standby mode or the lock mode, based on modes of the peripheral exercise machines arranged within the predetermined distance from the first exercise machine.

3. The method of claim 2, wherein the resetting of the mode of the first exercise machine comprises resetting the mode of the first exercise machine as the lock mode, when a time period of the exercise mode of the first exercise machine is greater than or equal to a first reference time period.

4. The method of claim 3, further comprising, when a time period during which the lock mode is set exceeds a second reference time period, resetting the mode of the first exercise machine as the standby mode or the lock mode.

5. The method of claim 1, further comprising, when a request to output a guide about an exercise machine is received from an external device, determining any one of exercise machines in the standby mode as the exercise machine to output the guide about.

6. The method of claim 5, further comprising, when a plurality of exercise machines are in the standby mode, determining the exercise machine to output the guide about based on a mode of a peripheral exercise machine arranged within the predetermined distance from the exercise machines in the standby mode.

7. The method of claim 5, further comprising, when a plurality of exercise machines are in the standby mode, determining an exercise machine having many peripheral exercise machines in the lock mode as the exercise machine to output the guide about.

8. The method of claim 5, further comprising transmitting information about the exercise machine to output the guide about to the external device.

9. The method of claim 5, further comprising requesting the exercise machine to output the guide about to output a guide indicator.

10. The method of claim 1, wherein the exercise machines comprise at least one of aerobic exercise machines and anaerobic exercise machines.

11. A server for managing a plurality of exercise machines, the server comprising:

a communicator configured to communicate with the plurality of exercise machines; and a processor configured to set a second exercise machine different from a first exercise machine and arranged within a predetermined distance from the first exercise machine from among the plurality of exercise machines in a lock mode, when a notification that the first exercise machine is set in an exercise mode is received, through the communicator, from the first exercise machine from among the plurality of exercise machines, wherein the processor is further configured to, when a second notification notifying that the exercise mode of the first exercise machine has ended is received from the first exercise machine, reset a mode of the second exercise machine as a standby mode or the lock mode, based on a mode of a peripheral exercise machine arranged within a predetermined distance from the second exercise machine, and wherein the mode of the second exercise machine is reset as the lock mode, when at least one of the peripheral exercise machines is in the exercise mode, or the mode of the second exercise machine is reset as the standby mode, when the peripheral exercise machines are in the lock mode or the standby mode.

12. The server of claim 11, wherein the processor is further configured to reset a mode of the first exercise machine as the standby mode or the lock mode, based on a mode of a peripheral exercise machine arranged within the predetermined distance from the first exercise machine.

* * * * *